United States Patent
Strobel et al.

(10) Patent No.: US 6,170,204 B1
(45) Date of Patent: Jan. 9, 2001

(54) VEHICLE SHELTER HAVING CHANNELS

(75) Inventors: Ronald T. Strobel, South Milwaukee; William C. Eungard, Waterford, both of WI (US)

(73) Assignee: Kelley Company, Inc., Mequon, WI (US)

(*) Notice: Under 35 U.S.C. 154(b), the term of this patent shall be extended for 0 days.

(21) Appl. No.: 09/364,236

(22) Filed: Jul. 29, 1999

Related U.S. Application Data

(60) Provisional application No. 60/094,529, filed on Jul. 29, 1998.

(51) Int. Cl.[7] ........................................... E06B 7/00
(52) U.S. Cl. ............................................. 52/173.2
(58) Field of Search ........................... 52/173.2, 2.12; 49/504, 505

(56) References Cited

U.S. PATENT DOCUMENTS

| | | | |
|---|---|---|---|
| 3,403,489 | * 10/1968 | Frommelt et al. | 52/173.2 |
| 3,557,508 | * 1/1971 | Frommelt et al. | 52/173.2 |
| 3,653,173 | * 4/1972 | Frommelt et al. | 52/173.2 |
| 3,699,733 | * 10/1972 | Frommelt et al. | 52/173.2 |
| 3,772,839 | * 11/1973 | Timbers | 52/173.2 |
| 3,792,559 | * 2/1974 | Frommelt et al. | 52/173.2 |
| 3,826,049 | * 7/1974 | Frommelt et al. | 52/173.2 |
| 4,805,362 | * 2/1989 | Frommelt et al. | 52/173.2 |
| 4,825,607 | 5/1989 | Frommelt et al. | 52/173 |
| 5,394,662 | 3/1995 | Giuliani et al. | 52/173 |
| 5,473,846 | 12/1995 | Giuliani et al. | 52/173.2 |

OTHER PUBLICATIONS

*Kelley Loading Dock Seals and Shelters* (1994).

* cited by examiner

*Primary Examiner*—David M. Purol
(74) *Attorney, Agent, or Firm*—Michael Best & Friedrich LLP

(57) ABSTRACT

A vehicle shelter comprising a head frame, a head curtain attached to the head frame, a side frame, and a side curtain attached to the side frame. The head frame includes a head subframe having a first raked channel adapted to be mounted to a loading dock wall, a plurality of cross channels attached (e.g., clinched) to and extending outward from said first raked channel, and a second raked channel attached (e.g., clinched) to said cross channels. The head frame further includes a head panel attached to an upper surface of said head subframe to form a barrier to the elements, and a head curtain mounted to the head frame. The side frame includes a side subframe having a first long channel adapted to be mounted to a loading dock wall, a plurality of cross channels attached (e.g., clinched) to and extending outward from said first long channel, and a second long channel attached (e.g., clinched) to said cross channels. The side frame further includes a side panel attached to a side surface of said side subframe to form a barrier to the elements.

17 Claims, 6 Drawing Sheets

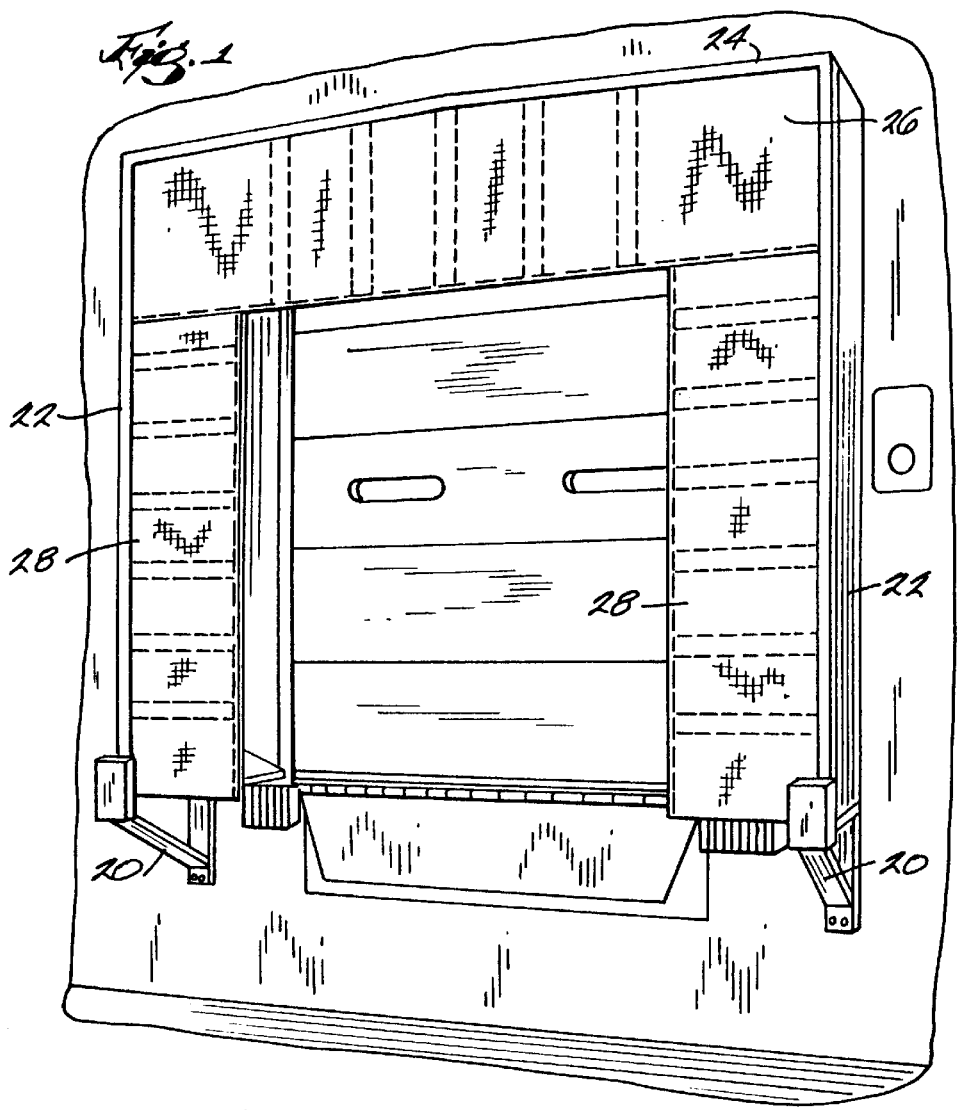
Fig. 1
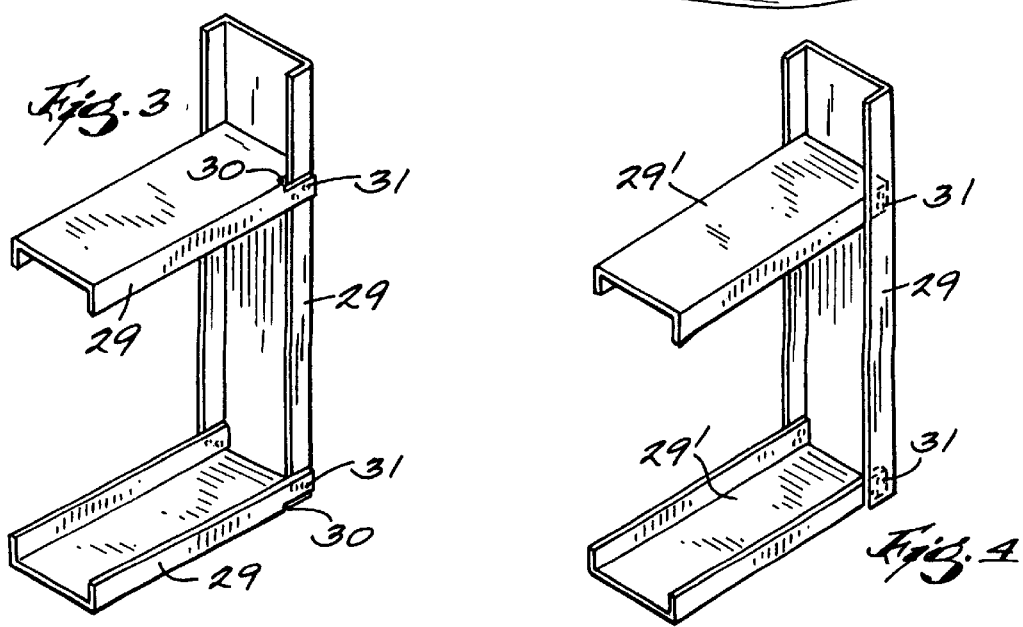
Fig. 3
Fig. 4

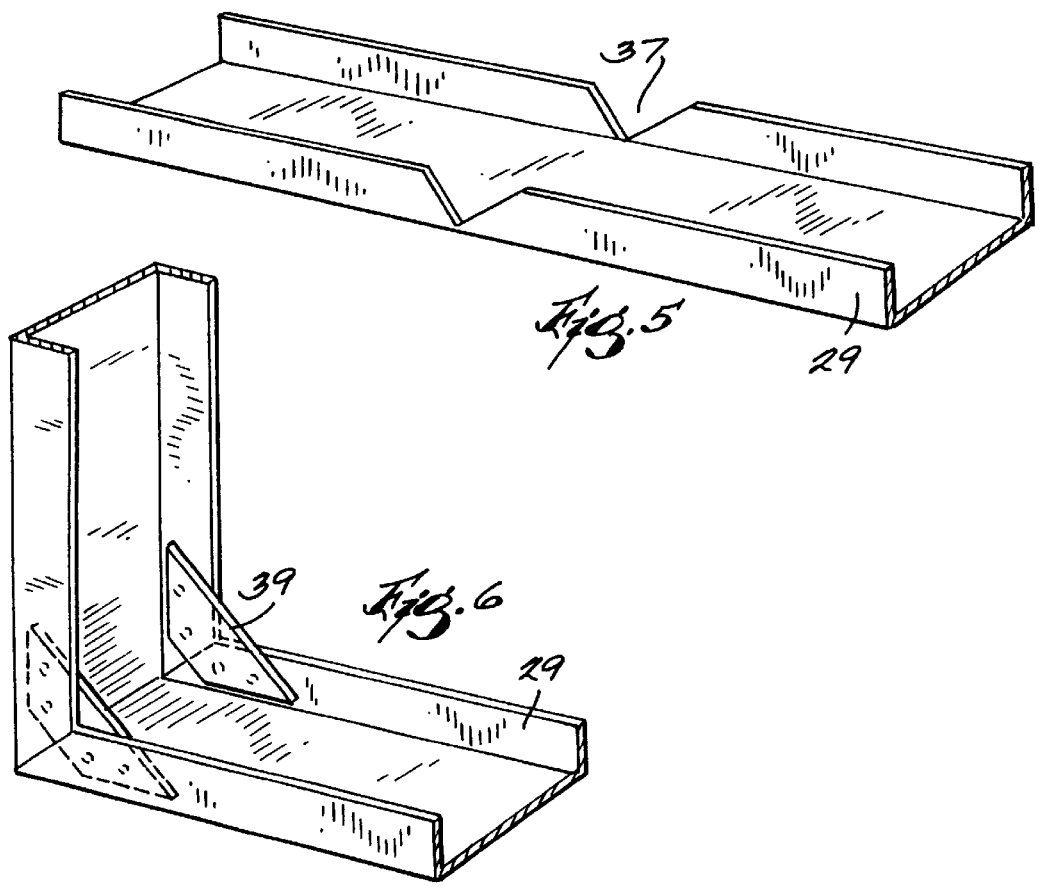
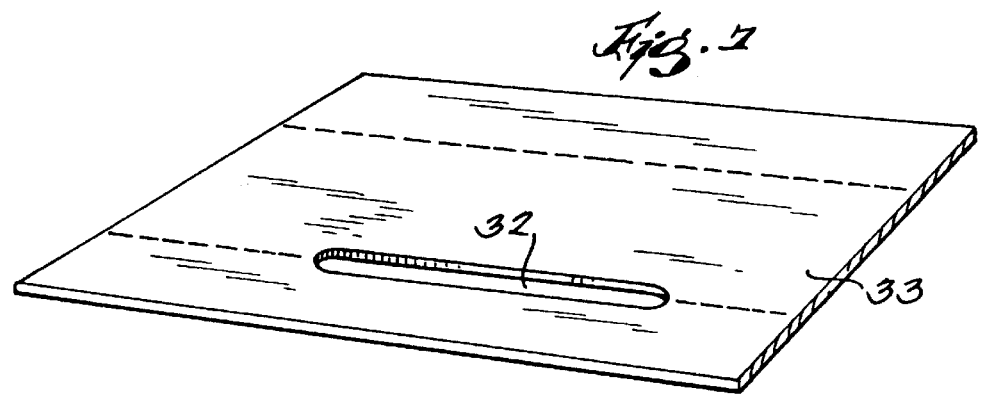
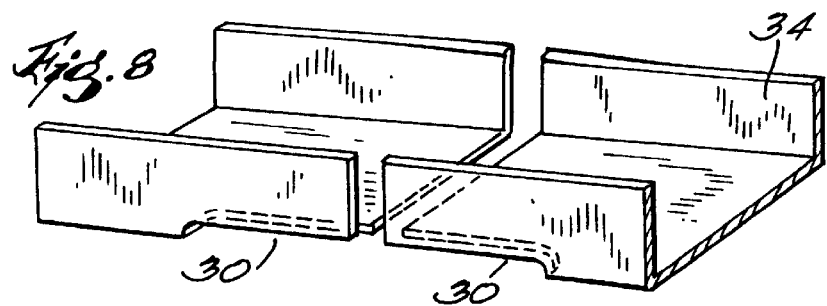

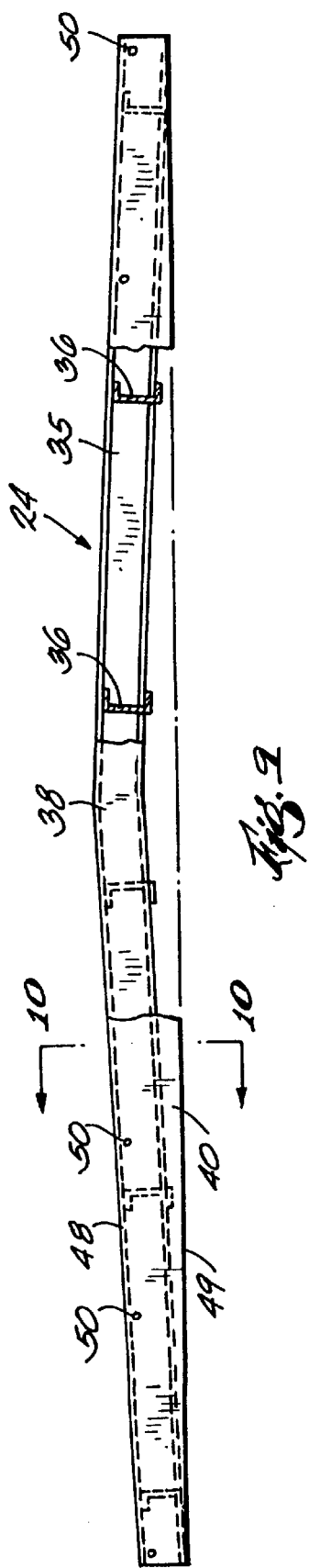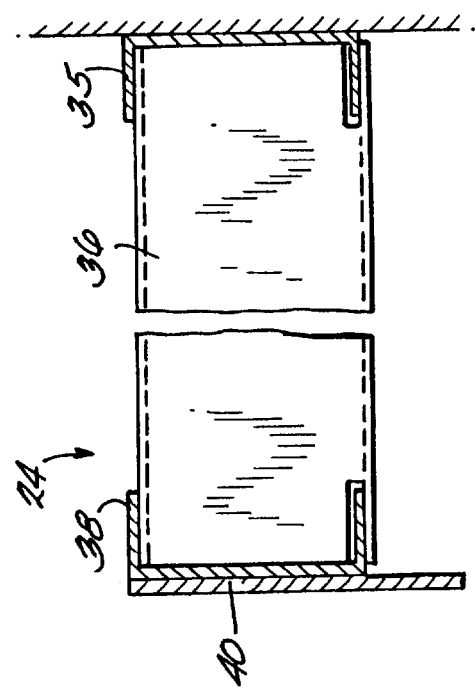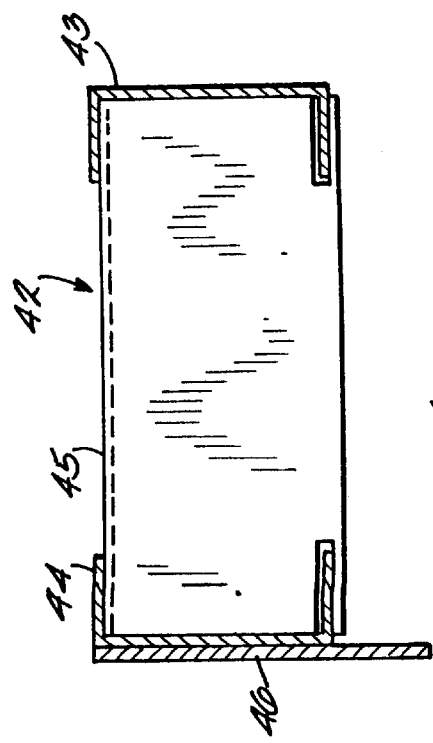

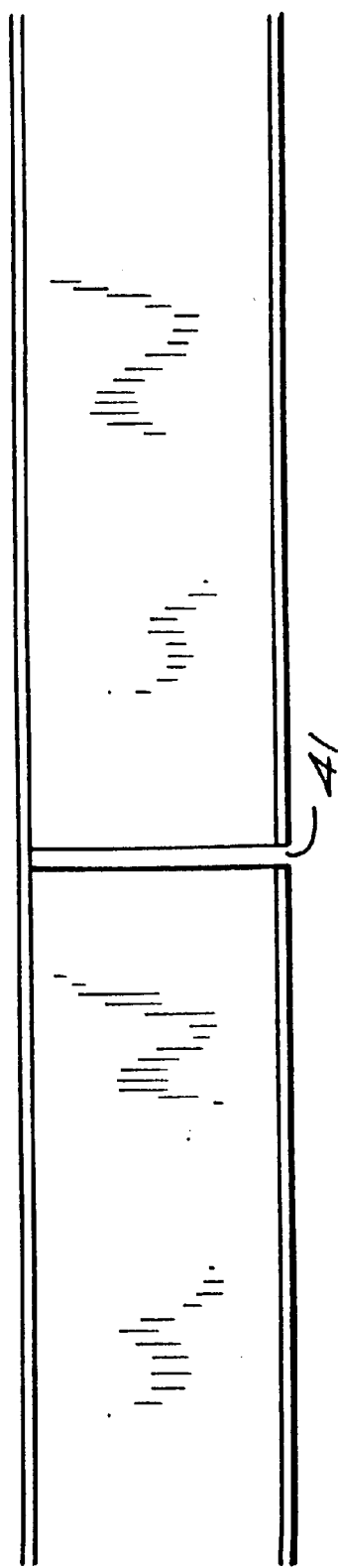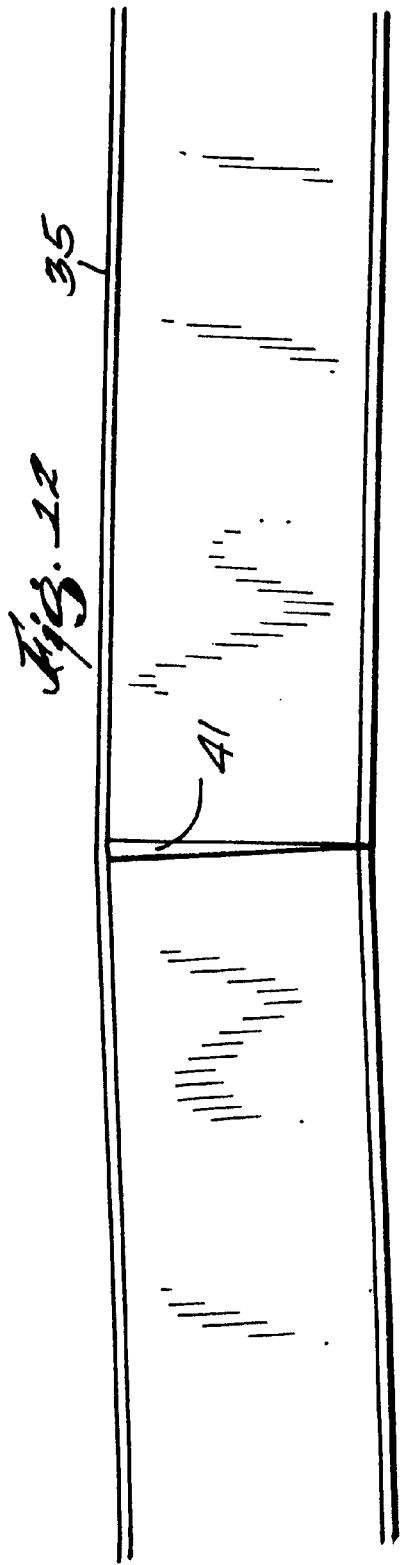

VEHICLE SHELTER HAVING CHANNELS

This application claims benefit to Provisional Application No. 60/094529 filed Jul. 29, 1998.

FIELD OF THE INVENTION

The present invention generally relates to the field of loading docks, and more specifically to loading dock shelters that are positioned around a loading dock opening to provide a shelter between the loading dock and the open end of a vehicle (e.g., a truck or trailer).

BACKGROUND OF THE INVENTION

Most warehouses, manufacturing facilities and large retail stores include loading docks that provide a location for loading and unloading vehicles. Loading docks typically include a raised platform and a dock opening positioned above the raised platform. The dock opening is formed by a dock wall having two vertical side portions extending upwardly from the platform, and a horizontal upper portion connecting the top of the side portions. A vehicle can back toward the dock opening until the back of the vehicle is abutting the platform. The platform sometimes includes a dockleveler that provides a ramp between the platform and the bed of the vehicle to facilitate loading and unloading of the vehicle (e.g., by a forklift).

Many loading docks include dock seals and shelters that provide a barrier between the dock wall and the back of the vehicle. For example, dock shelters can include rigid frame shelters that are made from wood or welded square steel tubing. The rigid frame typically includes a head frame positioned above the dock opening and side frames positioned on opposing sides of the dock opening. Fiberglass panels or flexible fabric covers the frames. In addition, a head curtain and side curtains with flexible stays are positioned in front of the frames and are designed to contact the vehicle to provide a barrier between the inside of the loading dock and the exterior environment.

The above-described dock shelters provide good protection against the elements. However, as with most loading dock equipment, it must withstand repeated uses under a variety of weather and loading conditions. Any increase in longevity of the dock shelters would therefore be an improvement. In addition, simplified construction techniques and improved structural stability are desirable design goals.

SUMMARY OF THE INVENTION

The present invention provides a rigid frame loading dock shelter that utilizes metal (e.g., galvanized steel) channel as a support structure. It has been found that the design of the present invention provides significant advantages over the use of wood in that wood may warp, twist, and split. The present invention is also resistant to rotting and insect damage.

More specifically, the present invention provides a vehicle shelter comprising a head frame, a head curtain attached to the head frame, a side frame, and a side curtain attached to the side frame. The head frame includes a head subframe having a first raked channel adapted to be mounted to a loading dock wall, a plurality of cross channels attached (e.g., clinched) to and extending outward from the first raked channel, and a second raked channel attached (e.g., clinched) to the cross channels. The head frame further includes a head panel attached to an upper surface of the head subframe to form a barrier to the elements, and a head curtain mounted to the head frame. The side frame includes a side subframe having a first long channel adapted to be mounted to a loading dock wall, a plurality of cross channels attached (e.g., clinched) to and extending outward from the first long channel, and a second long channel attached (e.g., clinched) to the cross channels. The side frame further includes a side panel attached to a side surface of the side subframe to form a barrier to the elements.

In one embodiment, in order to add further stability and strength, the head frame further includes a span bracket coupled to the second raked channel (e.g., to an outer surface of the second raked channel). In this embodiment, the head curtain can be secured to the span bracket. The span bracket is preferably thicker (e.g., about 2 times thicker) than the material used to produce the channels.

The present invention also provides an improved method of making a vehicle shelter head frame and mounting the head frame to a loading dock. The method comprises the steps of forming (e.g., rolling on a roll-forming machine) sheet metal into a plurality of channels, attaching (e.g., clinching) a long channel to a plurality of cross channels to form a subframe, coupling a panel to the subframe to produce a head frame, and mounting the head frame to a loading dock. In one embodiment, the method further includes the step of securing a span bracket to the long channel. In order to facilitate attachment of a head curtain, the method can further include the step of creating holes in the span bracket before the securing step.

In a preferred embodiment, the method further includes the step of bending the long channel into a raked channel. For example, the bending step can include positioning the long channel on a mandrel and applying a force to bend the long channel.

BRIEF DESCRIPTION OF THE DRAWINGS

FIG. 1 is a perspective view of a vehicle shelter embodying the present invention mounted onto a loading dock.

FIG. 3 is a perspective view of Detail 3 in FIG. 2.

FIG. 4 illustrates an alternative construction method of the assembly of FIG. 3.

FIG. 5 illustrates a channel member prepared for forming a corner according to an alternative construction method.

FIG. 6 illustrates an alternative construction method for a corner using the channel member of FIG. 5.

FIG. 7 illustrates a flat plate prepared for producing a channel having a slotted end for joining to another channel.

FIG. 8 illustrates the formation of the slotted end.

FIG. 9 is a front view of the head frame illustrated in FIG. 2.

FIG. 10 is a section view taken along line 10—10 in FIG. 9.

FIG. 11 is a front view of a channel before being bent into a raked channel.

FIG. 12 is a front view of the channel of FIG. 11 after being raked.

FIG. 13 is a section view of an extension assembly that can be used to extend the length of the head frame illustrated in FIG. 10.

DETAILED DESCRIPTION

Figure 2:
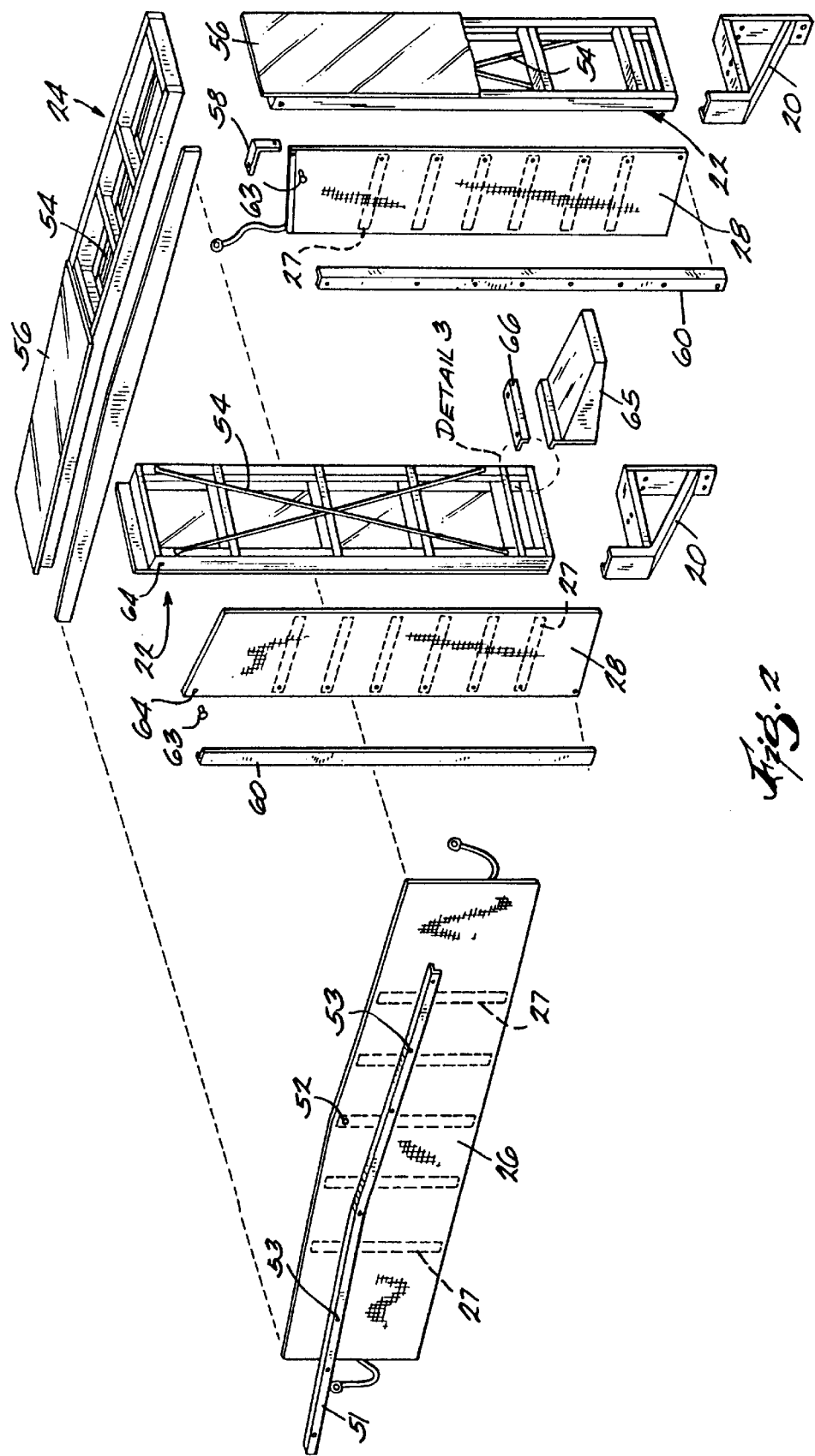
FIG. 2 is an exploded view of the vehicle shelter of FIG. 1.

Referring to FIGS. 1 and 2, the illustrated assembly generally includes steel supports 20 adapted to be mounted to the loading dock, side frames 22 adapted to be mounted on the steel supports 20, a head frame 24 positioned on top of the side frames 22, a head curtain 26 hanging pendent from the front of the head frame 24, and side curtains 28 extending inwardly from the front of the side frames 22. The head curtain 26 and the side curtains 28 include flexible stays 27, as is known in the art.

FIG. 3 shows the details of the construction technique for the illustrated side frames 22 and head frame 24. Construction of the frames involves the use of channels 29 that are preferably formed from galvanized steel sheet, although other appropriate materials could be used instead, such as aluminum, fiberglass, plastic, etc. The illustrated steel sheet is roll-formed into the illustrated channels 29. As used herein, a "channel" is an elongated structural member having an open cross section. For example, the cross section could be U-shaped, S-shaped, the illustrated C-shape, or any other open shape. The illustrated C-shape is preferred because it is simple to produce and can be easily joined to other channels. In addition, two C-shaped channels can be joined facing one another to produce a boxed cross section.

Slots 30 can be cut into the channels, and fasteners 31 can be used to facilitate assembly of the channels into the illustrated frames. Cutting slots 30 into the channels 29 allows the use of channels having the same cross-sectional dimensions, as illustrated in FIG. 3. Fasteners, such as rivets, screws, or bolts can be used to secured the channels together, or the channels can be welded together. However, the preferred technique is to clinch the two pieces together using, for example, a Spot Clinch® clincher sold by Attexor, Inc. of Springfield, Mass. Clinching the pieces together avoids the need to cut through or destroy (e.g., as can occur when using screws, bolts, or welding) the galvanized coating on the sheet metal, thereby enhancing the corrosion resistance of the channels. Alternatively, high strength adhesive, such as cyanoacrylate, could also be used to secure the channels together without harming the galvanized coating.

FIG. 4 illustrates an alternative construction technique for forming the head frame 24 and side frames 22. In this technique, some channels 29 are wider than other channels 29' to facilitate nesting of the channels without the need to form slots in the channels. The channels can be secured by clinching, riveting, screwing, bolting, welding or any other suitable fastening operation.

FIGS. 5 and 6 illustrate an alternative construction technique for forming a corner joint on the head frame or side frames. In this technique, the channel 29 is notched 37 and bent to form a 90-degree bend. Reinforcing gussets 39 are secured to the channel 29 to form a reinforced corner joint. The gussets 39 can be secured by clinching, riveting, screwing, bolting, welding, or any other suitable fastening operation.

FIGS. 7 and 8 illustrate a method for forming the slots 30 that are needed to produce the assembly illustrated in FIG. 3. In this method, a closed slot 32 is punched in a sheet 33 before the bending operation (FIG. 7). The sheet 33 is then bent into a channel 34, and the channel 34 is cut in the middle of the closed slot 32 to form two open slots 30 that are suitable for creating the joints shown in FIG. 3.

Referring to FIGS. 2, 9, and 10, the head frame 24 includes a first raked channel 35 adapted to be mounted to the loading dock, a plurality of cross channels 36 extending outwardly from the first raked channel 35, and a second raked channel 38 secured to the outer ends of the cross channels 36. An outer span bracket 40 is secured (e.g., clinched, screwed, riveted, bolted, welded, adhered, etc.) to the second raked channel 38 to provide rigidity and strength to the head frame 24.

The raked channels 35,38 can be formed by several different techniques. One technique is to cut a slot 41 through in the middle of the channel to be raked, as shown in FIG. 11. The slot 41 is made through one side and the back of the channel, but not through the other side. The channel can then be simply bent into the desired raked configuration, as shown in FIG. 12. Alternatively, it has been found that the channels can be bent into the desired raked configuration without the slot 41. This technique uses a bending fixture similar to a tube bender. If desired, the channel could be bent to a large radius so that the channel forms an arch, as opposed to the straight-sided raked configuration shown in the drawings.

FIG. 13 illustrates an extension assembly 42 that can be used to extend the length of the head frame 24. The extension assembly 42 includes a third raked channel 43, a fourth raked channel 44, and a plurality of extension channels 45 connecting the third raked channel 43 to the fourth raked channel 44. The extension assembly further includes an extension span bracket 46 to provide rigidity and strength to the assembly. The third raked channel 43 can be fastened directly to the outer span bracket 40.

Figure 14:
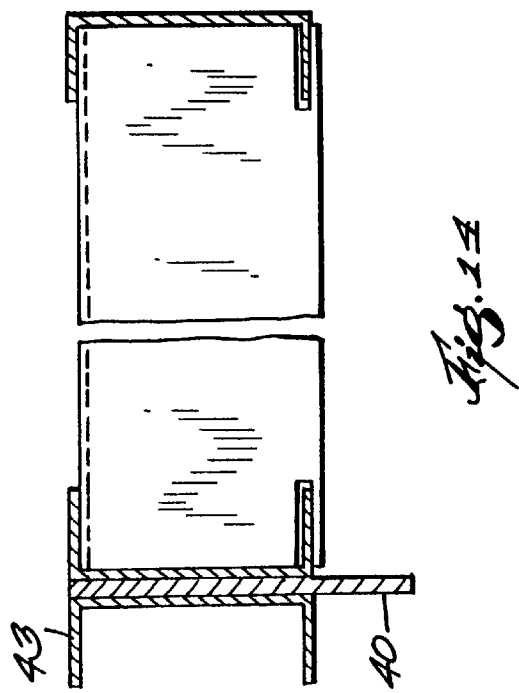
FIG. 14 is a section view of an alternative head frame construction.
Figure 15:
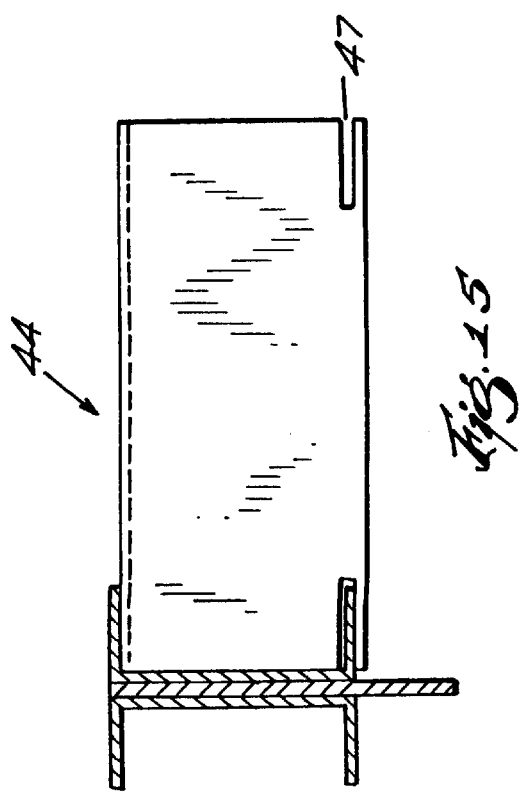
FIG. 15 is a section view of an alternative extension assembly that can be used to extend the length of the head frame illustrated in FIG. 12.

FIG. 14 illustrates an alternative construction wherein the third raked channel 43 is secured to the outer span bracket 40 to provide further strength and rigidity to the head frame 24. In this embodiment, the outer span bracket 40 may not need to be as thick as the span bracket illustrated in FIG. 10. FIG. 15 illustrates an extension assembly 44 that can be used to extend the length of the assembly illustrated in FIG. 14. More specifically, the slot 47 in the extension assembly can be engaged with and secured to the third raked channel 43 of FIG. 14 to provide an extension.

The outer span bracket 40 comprises a heavy-gauge steel, such as 11 gage galvanized steel. Depending on the square footage (width and projection) of the head frame, it may be desirable to use two outer span brackets 40 positioned flush against each other to further strengthen and stabilize the shelter. The outer span bracket 40 is preferably laser cut to the desired shape. As shown in FIG. 9, the illustrated outer span bracket 40 includes a raked upper portion 48 and a flat lower portion 49. It is anticipated that a single sized outer span bracket 40 will be utilized for shelters of different widths.

In order to facilitate attachment of the head curtain 26, the outer span bracket 40 includes a series of holes 50 that are sized to receive self-tapping screws (not shown) that are inserted through a raked aluminum angle 51 (FIG. 2) and through the head curtain 26. In the preferred embodiment, the holes 50 are formed by the laser-cutting machine that cuts the shape of the outer span bracket 40. The head curtain 26 includes a pre-formed center hole 52 (FIG. 1), which allows easy insertion of the first fastener into the outer span bracket 40. The center hole 52 insures that the head curtain is centered relative to the outer span bracket 40. Attachment of the head curtain 26 continues to the sides by inserting fasteners through the aluminum angle 51, through the head curtain 26, and into the pre-drilled holes 50. The aluminum angle is provided with pre-drilled holes or markings 53 (FIG. 2) in alignment with the pre-drilled holes 50 in the outer span bracket 40 to insure alignment of the fasteners with the pre-drilled holes 50.

When attaching the illustrated shelter to a metal building, an inner span bracket (not shown), similar to the outer span bracket 40, is used between the building and the first raked channel 35 to provide additional strength and rigidity to the structure.

Cross-brace straps 54 are secured to each of the side frames 22 and the head frame 24 in the illustrated manner (FIG. 2). The straps 54 can include any appropriate material, such as steel or synthetic strap. The straps 54 help prevent warping and twisting of the frames during transit and installation. In addition, the straps 54 inhibit the side frames 22 from forming a parallelogram during transit and installation.

Referring back to FIG. 2, semi-transparent fiberglass panels 56 are attached to the side frames 22 and the head frame 24 to provide a barrier to the elements, and to allow some amount of light to pass through. The side frames 22 are secured to the head frame 24 by angle brackets 58 (only one shown in FIG. 2) and corresponding fasteners (not shown), and the side curtains 28 are attached to the side frames 22 by aluminum angles 60 and corresponding self-tapping screws (not shown). Each self-tapping screw is preferably inserted through one of the stays 27 in the side curtain 28. In order to support and align the side curtains 28 during attachment, a ratchet fastener 63 (a.k.a. a christmas-tree clip) can be inserted through holes 64 in the upper end of the side curtain 28 and the side frame 22. A draft pad 65 is attached to each side frame 22 by an aluminum angle 66 and corresponding fasteners (not shown).

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A vehicle shelter adapted to be mounted to a loading dock, said shelter comprising:
   a head frame including a head subframe having a first raked channel adapted to be mounted to a loading dock wall, a plurality of head cross channels attached to and extending outward from said first raked channel, and a second raked channel attached to said head cross channels, said head frame further including a head panel attached to an upper surface of said head subframe to form a barrier to the elements;
   a head curtain mounted to said head frame;
   a side frame including a side subframe having a first long channel adapted to be mounted to a loading dock wall, a plurality of side cross channels attached to and extending outward from said first long channel, and a second long channel attached to said side cross channels, said side frame further including a side panel attached to a side surface of said side subframe to form a barrier to the elements; and
   a side curtain mounted to said side frame.

2. A vehicle shelter as claimed in claim 1, wherein said head frame further includes a span bracket coupled to said second raked channel.

3. A vehicle shelter as claimed in claim 2, wherein said head cross channels are attached to an inner surface of said second raked channel, and wherein said span bracket is coupled to an outer surface of said second raked channel.

4. A vehicle shelter as claimed in claim 2, wherein said head curtain is secured to said span bracket.

5. A vehicle shelter as claimed in claim 2, wherein said head cross channels are made from sheet metal, and wherein said span bracket is thicker than said sheet metal.

6. A vehicle shelter as claimed in claim 5, wherein said span bracket is at least 1.5 times thicker than said sheet metal.

7. A vehicle shelter as claimed in claim 1, wherein said head cross channels are clinched to said first raked channel.

8. A vehicle shelter as claimed in claim 1, wherein said head cross channels are adhered to said first raked channel.

9. A vehicle shelter as claimed in claim 1, wherein at least one of said head cross channels includes a slot, and wherein a portion of said first raked channel is positioned within said slot.

10. A method of making a vehicle shelter head frame and mounting the head frame to a loading dock, said method comprising the steps of:
    forming a plurality of channels;
    attaching a long channel to a plurality of cross channels to form a subframe;
    coupling a panel to the subframe to produce a head frame; and
    mounting the head frame to a loading dock.

11. A method as claimed in claim 10, wherein said forming step includes the step of rolling sheet metal on a roll-forming machine.

12. A method as claimed in claim 10, wherein said attaching step includes clinching the long channel to the cross channels.

13. A method as claimed in claim 10, further comprising the step of securing a span bracket to the long channel.

14. A method as claimed in claim 13, further comprising the step of creating holes in the span bracket before said securing step.

15. A method as claimed in claim 10, further comprising the step of bending the long channel into a raked channel.

16. A method as claimed in claim 15, wherein said bending step includes positioning the channel on a mandrel and applying a force to bend the channel in a midportion of the channel.

17. A method as claimed in claim 15, wherein said raked channel is a first raked channel, wherein said attaching step includes attaching the first raked channel to a first end of the plurality of cross channels, and wherein said method further comprises the steps of:
    bending a channel into a second raked channel; and
    attaching the second raked channel to a second end of the cross channels.

* * * * *